United States Patent
George et al.

(10) Patent No.: US 7,443,794 B2
(45) Date of Patent: Oct. 28, 2008

(54) FIBRE CHANNEL CREDIT EXTENDER AND REPEATER

(75) Inventors: William R. George, Minneapolis, MN (US); Steven M. Betker, Shoreview, MN (US)

(73) Assignee: QLogic Switch Products, Inc., Eden Prairie, MN (US)

( * ) Notice: Subject to any disclaimer, the term of this patent is extended or adjusted under 35 U.S.C. 154(b) by 1154 days.

(21) Appl. No.: 10/166,570

(22) Filed: Jun. 10, 2002

(65) Prior Publication Data

US 2003/0016683 A1 Jan. 23, 2003

(51) Int. Cl.
*H04L 12/26* (2006.01)
(52) U.S. Cl. .............................. 370/231; 370/235
(58) Field of Classification Search ............. 370/231, 370/235
See application file for complete search history.

(56) References Cited

U.S. PATENT DOCUMENTS

| | | | |
|---|---|---|---|
| 4,162,375 A | 7/1979 | Schlichte | 179/15 |
| 4,425,640 A | 1/1984 | Philip et al. | 370/58 |
| 4,475,192 A | 10/1984 | Fernow et al. | |
| 4,546,468 A | 10/1985 | Christmas et al. | 370/54 |
| 4,569,043 A | 2/1986 | Simmons et al. | 370/63 |
| 4,725,835 A | 2/1988 | Schreiner et al. | 340/825.83 |
| 4,821,034 A | 4/1989 | Anderson et al. | 340/825 |
| 5,144,622 A | 9/1992 | Takiyasu et al. | 370/85.13 |
| 5,367,520 A | 11/1994 | Cordell | 370/60 |
| 5,528,591 A | 6/1996 | Lauer | |

(Continued)

FOREIGN PATENT DOCUMENTS

EP 0649098 9/1994

(Continued)

OTHER PUBLICATIONS

Anderson, T M., et al., "High Performance Switch Fabric Element and Switch Systems", U.S. Appl. No. 10/752,390, a Continuation of U.S. Appl. No. 09/346,793, filed Jul. 2, 1999.

(Continued)

*Primary Examiner*—Firmin Backer
*Assistant Examiner*—Toan Nguyen
(74) *Attorney, Agent, or Firm*—Schwegman, Lundberg & Woessner, P.A.

(57) ABSTRACT

The Fiber Channel Credit Extender (FCCE) (600) is a network device that is disposed between and connected to an end node (210) and an optical repeater (220). The FCCE (600) contains as many buffer credits as necessary, to solve bandwidth problems in a network. In a situation where maximum bandwidth is required in both directions of a link, the FCCE (600) breaks a single logical link into three physically separated "linklets." The short-distance linklets attain maximum bandwidth by use of the existing buffer credits of the end nodes. The long-distance linklet attains maximum bandwidth by use of very high receive buffer credits in the FCCEs (600). In this way, only those links that need maximum bandwidth over distances not covered by end-node credit counts need be attached to an FCCE (600). The FCCE (600) contains the optical repeater to gain distance on that link, and contains high credit count receive buffers to gain bandwidth on the link. All other ports of the switch can have smaller and less expensive receive buffers.

6 Claims, 9 Drawing Sheets

U.S. PATENT DOCUMENTS

| | | | | |
|---|---|---|---|---|
| 5,598,541 | A | 1/1997 | Malladi | 395/286 |
| 5,610,745 | A | 3/1997 | Bennett | 359/139 |
| 5,633,867 | A * | 5/1997 | Ben-Nun et al. | 370/399 |
| 5,687,172 | A | 11/1997 | Cloonan et al. | 370/395 |
| 5,748,612 | A | 5/1998 | Stoevhase et al. | 370/230 |
| 5,818,842 | A | 10/1998 | Burwell et al. | 370/397 |
| 5,825,748 | A * | 10/1998 | Barkey et al. | 370/236 |
| 5,987,028 | A | 11/1999 | Yang et al. | 370/380 |
| 5,999,528 | A | 12/1999 | Chow et al. | 370/365 |
| 6,014,383 | A | 1/2000 | McCarty | 370/453 |
| 6,021,128 | A | 2/2000 | Hosoya et al. | 370/380 |
| 6,047,323 | A | 4/2000 | Krause | 709/201 |
| 6,081,512 | A | 6/2000 | Muller et al. | 370/256 |
| 6,118,776 | A | 9/2000 | Berman | |
| 6,128,292 | A | 10/2000 | Kim et al. | 370/356 |
| 6,160,813 | A | 12/2000 | Banks et al. | 370/422 |
| 6,185,203 | B1 | 2/2001 | Berman | |
| 6,289,386 | B1 * | 9/2001 | Vangemert | 709/232 |
| 6,308,220 | B1 | 10/2001 | Mathur | 709/238 |
| 6,324,181 | B1 | 11/2001 | Wong et al. | 370/403 |
| 6,330,236 | B1 | 12/2001 | Ofek et al. | 370/369 |
| 6,411,599 | B1 | 6/2002 | Blanc et al. | 370/219 |
| 6,424,658 | B1 | 7/2002 | Mathur | 370/429 |
| 6,449,274 | B1 | 9/2002 | Holden et al. | 370/392 |
| 6,470,007 | B1 | 10/2002 | Berman | |
| 6,484,173 | B1 | 11/2002 | O'Hare et al. | |
| 6,597,691 | B1 | 7/2003 | Anderson | 370/360 |
| 6,647,019 | B1 * | 11/2003 | McKeown et al. | 370/422 |
| 6,697,359 | B1 * | 2/2004 | George | 370/357 |
| 6,839,747 | B1 | 1/2005 | Blumenau et al. | |
| 6,904,053 | B1 | 6/2005 | Berman | |
| 6,980,525 | B2 | 12/2005 | Banks et al. | |
| 7,165,152 | B2 | 1/2007 | Blumenau et al. | |
| 7,248,580 | B2 | 7/2007 | George et al. | |
| 2001/0038628 | A1 | 11/2001 | Ofek et al. | 370/382 |
| 2003/0179748 | A1 | 9/2003 | George et al. | 370/389 |
| 2004/0028038 | A1 | 2/2004 | Anderson et al. | 370/386 |

FOREIGN PATENT DOCUMENTS

| | | |
|---|---|---|
| EP | 0856969 | 1/1998 |
| WO | WO-98/36537 | 8/1998 |

OTHER PUBLICATIONS

Clark, Tom, "Zoning for Fibre Channel Fabrics", *Vixel Corporation Paper*—XP002185194, (Aug. 1999), pp. 1-6.

Malavalli, Kumar, et al., "Distributed computing with fibre channel fabric", Proc. of the Computer Soc. Int'l Conf., Los Alamitos, *IEEE Comp Soc. Press.*, vol. Conf. 37, XP000340745, (Feb. 1992), pp. 269-274.

Martin, Charles R., "Fabric interconnection of fibre channel standard nodes", *Proceedings of the SPIE*, (Sep. 1992), pp. 65-71.

Yoshida, Hu, "LUN Security Considerations for Storage Area Networks", *Hitachi Data Systems Paper*—XP002185193, (1999), pp. 1-7.

"Supplemental European Search Report from corresponding European Patent Application No. EP 00 98 4224", (Dec. 9, 2004), 2 Pages.

* cited by examiner

FIBRE CHANNEL CREDIT EXTENDER AND REPEATER

This application claims the benefit of priority under 35 U.S.C. 120 to International Application No. PCT/US00/33610, filed Dec. 11, 2000, which claims priority under 35 U.S.C. 119(e) to U.S. Provisional Patent Application Ser. No. 60/170,184, filed Dec. 10, 1999, and to U.S. Provisional Patent Application Ser. No. 60/183,479, filed Feb. 18, 2000, all of which are incorporated herein by reference in their entireties.

FIELD

This invention relates generally to optical communications and more particularly to a fibre channel network device.

BACKGROUND

The need for high performance switching solutions continues to grow in the fields of computing and data handling systems. Examples of such systems include interconnecting computers and high-performance storage devices, interconnecting computers in a multiple-computer operating environment, and anywhere else where multiple high-speed data interconnections must be established between designated nodes or groups of nodes in a data handling network. A switch is a network device at a node that sends and receives data across the network in units of frames. Higher bandwidth and greater switching flexibility are prime concerns for switches and devices to be used in such systems.

The Fibre Channel standard, ANSI X3.T11, is intended to address these concerns. The Fibre Channel standard itself broadly defines classes and standards of performance, but does not dictate the implementation technologies to be used in providing these functions. A particular design of a switch to implement Fibre Channel functions is referred to as the "fabric" of the switch.

In order to increase the physical distance between switches, they often contain optical repeaters that transmit data across the network. The problem is that although the optical repeaters give the distance required, they almost always result in a very low sustainable bandwidth, especially if the link distance between nodes is quite long, such as 100 kilometers or more.

Thus, most conventional switches contain memory called buffers to hold the frames received and sent across the network. Associated with these buffers are credits, which are the number of frames that a buffer can hold per fabric port.

Most existing FC switches have approximately 8-32 credits per fabric port. These easily meet most requirements for longwave and shortwave links. Recently, the demand for longer links has increased, where 100 kilometer links are very popular. 100 kilometer links require approximately 62 credits per link receiver at 1G, 124 credits at 2G, and 248 credits at 4G. It's not always possible, practical or desirable, to have available this much credit at the end of long links, especially FC switches, due to cost and integration concerns. Given especially that switch users would like to connect a long link to any switch port, it forces all switch ports to have a very large credit count or dynamic access to a very large credit count. This is especially impractical given that in larger switch fabrics consisting of multiple switch boxes, the E_Ports (or trunk ports) usually require very little buffering because of the short interconnect. Forcing large credit count buffers onto all ports of a switch increases cost and precludes highly integrated architectures.

In addition, the link has to be routed through optical repeaters on both ends, in order to operate reliably over the 100 kilometers. A typical installation has each end node connected to an optical repeater box, typically in the same room and typically via a shortwave cable. The long link then is actually between the two optical repeaters and what is typically commercially available dark fiber.

Thus, there is a need for a technique to increase the performance of switches.

SUMMARY

The present invention provides further improvements in high performance switching networks and methodology, and for providing a practical implementation of Fibre Channel protocols.

In one aspect, the present invention achieves this through a credit extender. The Fibre Channel Credit Extender (FCCE) is a network device that is disposed between and connected to an end node and an optical repeater. The FCCE contains as many buffer credits as necessary, to solve the bandwidth problem. In a situation where maximum bandwidth is required in both directions of a link, the FCCE breaks a single logical link into three physically separated "linklets." The short-distance linklets attain maximum bandwidth by use of the existing buffer credits of the end nodes. The long-distance linklet attains maximum bandwidth by use of very high receive buffer credits in the FCCEs.

In this way, only those links that need maximum bandwidth over distances not covered by end-node credit counts need be attached to an FCCE. The FCCE contains the optical repeater to gain distance on that link, and contains high credit count receive buffers to gain bandwidth on the link. All other ports of the switch can have smaller and cheaper receive buffers.

According to another aspect of the invention, the present invention provides a non-transparent fibre channel credit based repeater (FCBR) included with an end-node fabric manager, which controls FCBR initialization and distribution of buffer credits. Since, is this aspect, there is no need for the FCBR to sink and source frames, frame buffers and an outbound link buffer are not needed in the FCBR, which simplifies the design.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims. For example, although embodiments of the present invention are described in the context of the fibre channel bus, in other embodiments, any suitable bus can be used.

The detailed description is divided into two embodiments, (I) the fibre channel credit extender embodiment and (II) the fibre channel credit based repeater embodiment.

I. Fibre Channel Credit Extender Embodiment

The following nine statements describe one embodiment of a fibre channel credit extender:

1. An FCCE (fibre channel credit extender) can be added onto any Fibre Channel non-Arbitrated Loop link utilizing R_RDY flow control and FC standard login functions, which includes N_Ports, F_Ports and E_Ports, to increase the maximum sustainable bandwidth where bandwidth would otherwise be lost due to insufficient end-node credit.

2. The FCCE is an inline link device that provides full bandwidth on any length link by inserting inline additional credits, up to the limit of 256 Fibre Channel credits.

100 MB/s up to 412 KM for 1G links with 256 credits
200 MB/s up to 206 KM for 2G links with 256 credits
400 MB/s up to 103 KM for 4G links with 256 credits 3. An FCCE can be installed at both ends of a link for duplex full bandwidth, or at one end of a link for full bandwidth in one direction only.

4. An FCCE is transparent to the end nodes. Each end node logs into the other end node, even though there are intermediate devices. All link initialization and reinitialization intended to cover the link, covers all linklets.

5. Credit assignment at FCCEs and end nodes can be accomplished either by explicit fabric management commands, or by FCCE transparent manipulation of the "Buffer-To-Buffer Credit" field of FLOGI (fabric login) and PLOGI (processor login) frames.

6. FC links are designed to achieve a maximum sustainable data transfer rate of approximately 100 MB/s if the link is running at a raw serial rate of 1.0625 Gb/s (1G), 200 MB/s if the link is running at 2.125 Gb/s (2 g), or 400 MB/s if the link is running at 4.25 Gb/s (4G).

7. These maximum transfer rates can be achieved when FC adapters transmit long packets of data that are a sequence of back-to-back maximum length frames (2084 byte frames with 2048 byte payload), with a minimum of IDLE sequences (typically 6, but as many as 21) between each frame.

8. An additional requirement for maximum transfer rates is that there are sufficient receive buffer credits relative to the link length and raw transfer rate. If there are not enough receiver credits relative to link length and rate, actual sustainable bandwidth will be less than the maximum and can easily be much less than maximum, approaching less than 10% in some cases.

9. The general rule-of-thumb for calculating the number of receive credits required to achieve maximum bandwidth relative to length is 0.6 credits/kilometer for 1G, 1.2 credits/kilometer for 2G, and 2.4 credits/kilometer for 4G. Thus, a low number of credits is required to meet the standard Fibre Channel shortwave and longwave requirements. A 500 meter link using 1G/2G/4G shortwave requires 0.3/0.6/1.2 credits, and 10 kilometer link using 1G/2G/4G longwave requires 6/12/24 credits.

Figure 1:
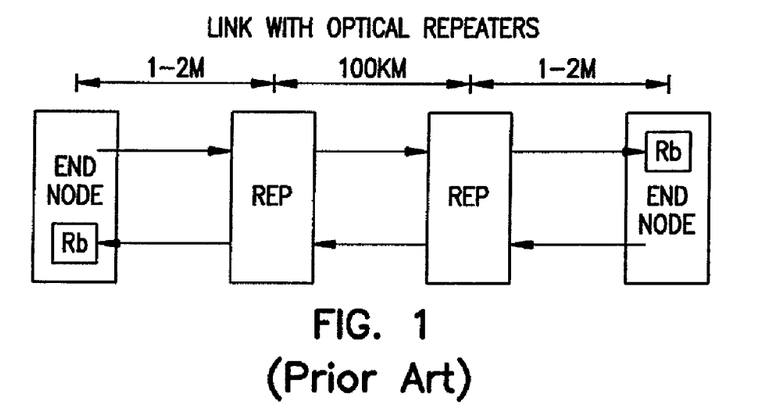
FIG. 1 depicts a block diagram of a prior art fibre channel link.

FIG. 1 depicts an example prior art fibre channel link, which shows a 100 KM link utilizing only optical repeaters (Rep), and showing the receive buffers (Rb) whose credit counts determine the max link bandwidths.

The problem is that although the optical repeaters give the distance required, it almost always results in very low sustainable bandwidth, particularly if the link distance is quite long, especially 100 kilometers or more. The FCCE solves this problem as described below.

Figure 2:
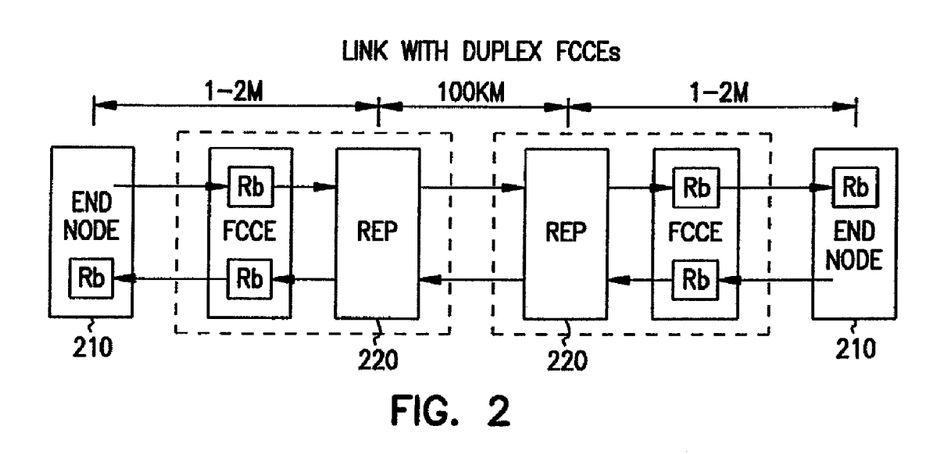
FIG. 2 depicts a block diagram of a 100 KM link with inline FCCEs, coupled together in the same box as the optical repeaters, according to an embodiment of the invention.

FIG. 2 shows a 100 KM link with the inline FCCEs, coupled together in the same box as the optical repeaters.

The Fibre Channel Credit Extender (FCCE) is a device that is between an end node 210 and an optical repeater 220 that contains as many buffer credits as necessary, to solve the bandwidth problem. In a situation where maximum bandwidth is required in both directions of a link, it essentially breaks a single logical link into three physically separated "linklets." The short-distance linklets (within the same room in one embodiment) attain maximum bandwidth by use of the existing buffer credits of the end nodes. The long-distance linklet (dark fiber up to 100 KM in one embodiment) attains maximum bandwidth by use of very high receive buffer credits in the FCCEs.

In this way, only those links that need maximum bandwidth over distances not covered by end-node credit counts, need be attached to an FCCE. The FCCE contains the optical repeater to gain distance on that link, and contains high credit count receive buffers to gain bandwidth on the link. All other ports of the switch can have smaller and cheaper receive buffers.

Figure 3:
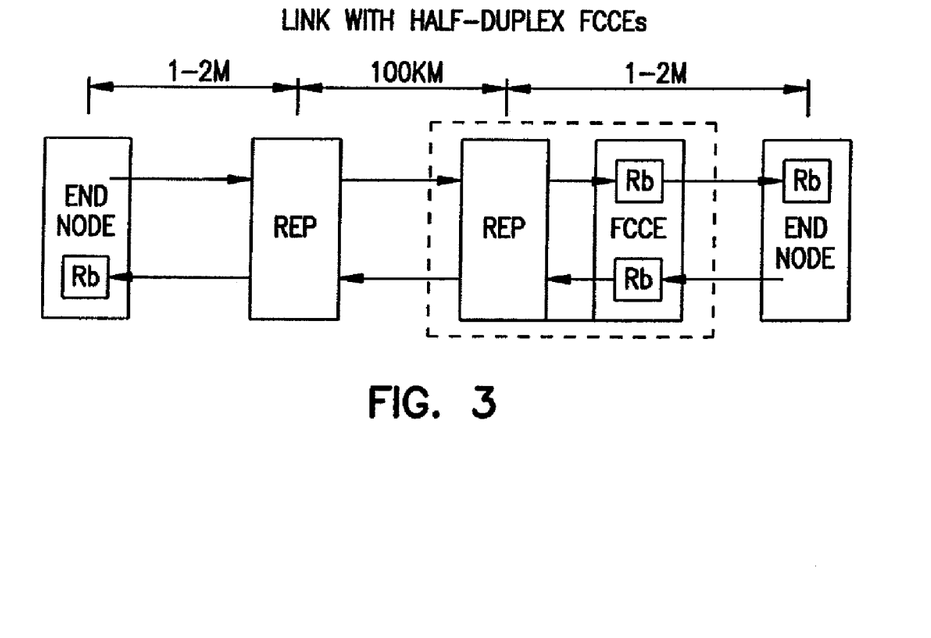
FIG. 3 depicts a block diagram of the FCCE installed on only one end, which is the end that is receiving the high bandwidth, according to an embodiment of the invention.

FIG. 3 shows the FCCE installed on only one end, which is the end that is receiving the high bandwidth. This embodiment provides a cost savings if the maximum bandwidth requirement is in one direction only. In FIG. 3, the left-to-right direction has the maximum bandwidth. The same diagram would apply if duplex full bandwidth is required where one end node had sufficient credits, and the other end node did not.

Figure 4:
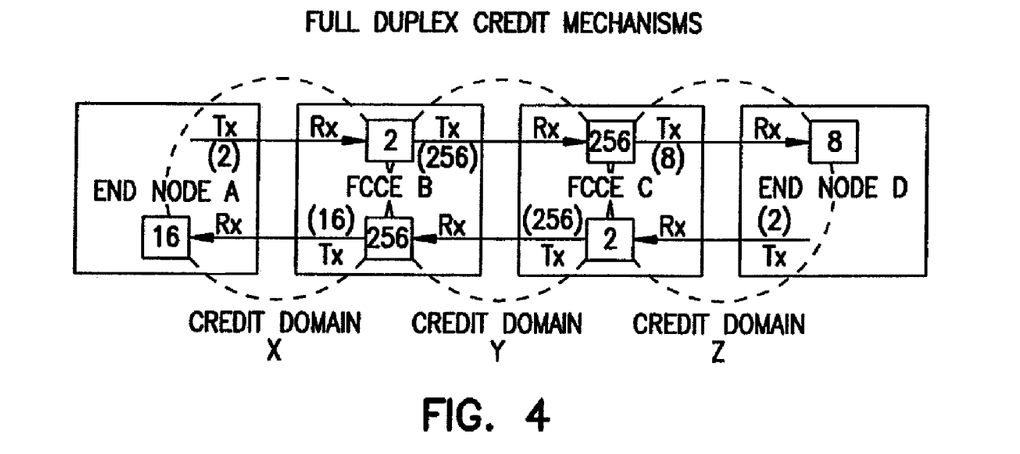
FIG. 4 depicts a block diagram of the duplex link simplified, showing only the credit mechanisms, which determine bandwidth on the link, according to an embodiment of the invention.

FIG. 4 shows the duplex link simplified, showing only the credit mechanisms, which determine bandwidth on the link, as follows, where all receive buffers are shown with some suggested FCCE receive buffer credit values used in one embodiment that are high enough to solve the problem.

The end nodes show typical credit counts of 8 and 16. The FCCE has what may be ideal credit counts, where two credits are sufficient for the linklet length of 1-2 meters between the end node and the FCCE, and where 256 credits between the FCCEs on either end of the long linklet provides for maximum bandwidth on the longest distances possible, in one embodiment. However, FCCE Receive Buffers can be designed with any credit count up to the maximum of 256, as per Fibre Channel rules.

Each linklet is a separate credit domain, and each follows Fibre Channel rules for R_RDY flow control within the domain. Shown in parentheses are the remote credit counts that each transmitter must deal with for the FCCE concept to work, in one embodiment. The FCCE provides a method where these credits are properly distributed prior to full bandwidth use of the link. In one embodiment, these credits can be gained either by either of two methods: 1) explicitly programming each transmitter via fabric manager commands at all link devices, or 2) by intercepting the login request and response frames in the FCCEs for the purpose of manipulating the credit counts. In either case, all devices, including the end nodes and the FCCEs follow the Fibre Channel practice of assuming one credit receive buffer until a larger credit count is specified.

The first method, i.e., explicit assignment of credits, is self-explanatory.

Figure 5:
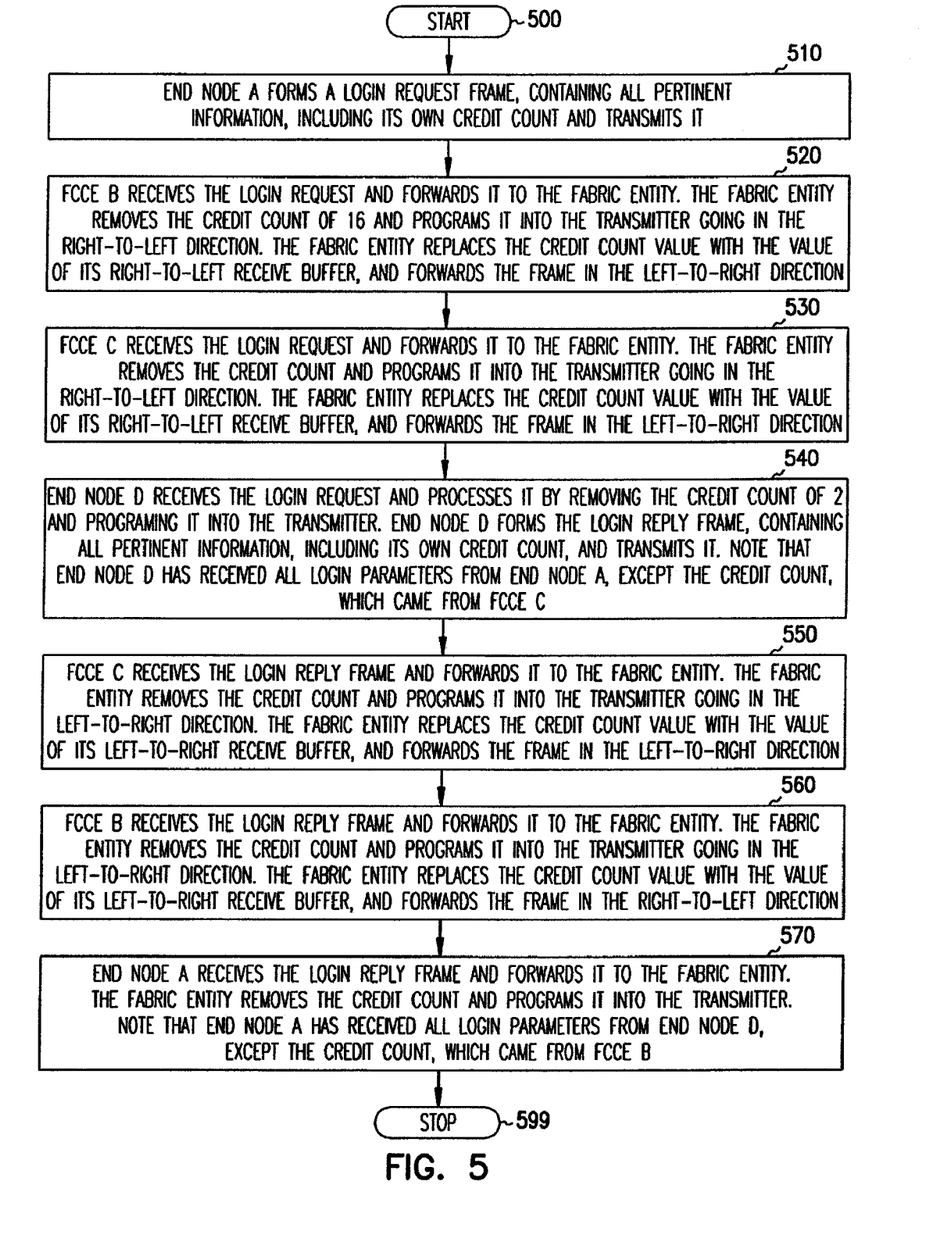
FIG. 5 depicts a block diagram of an example flowchart that describes a method for intercepting login request and response frames in the FCCEs for manipulating credit counts, according to an embodiment of the invention.

FIG. 5 depicts a flow chart for carrying out the second method, i.e., assignment of credits by FCCE login request/response frame interception and manipulation. All login frames are intercepted by the FCCE and delivered to the fabric entity, which typically is a microprocessor, but which can be any form of a state machine. The FCCE fabric removes the credit count from the frame and installs it at the transmitter going back in the direction the frame arrived, then substitutes its own credit count in the login frame and forwards it in the same direction.

Control begins at block 500. Control then continues to block 510 where end node A forms a login request frame, containing all pertinent information, including its own credit count of 16 (in one embodiment), and transmits it. Control then continues to block 520 where FCCE B receives the login request and forwards it to the fabric entity. The fabric entity removes the credit count of 16 (in one embodiment) and programs it into the transmitter going in the right-to-left direction. The fabric entity replaces the credit count value of 16 (in one embodiment) with the value of its right-to-left receive buffer, 256 (in one embodiment), and forwards the frame in the left-to-right direction.

Control then continues to block 530 where FCCE C receives the login request and forwards it to the fabric entity. The fabric entity removes the credit count of 256 (in one embodiment) and programs it into the transmitter going in the right-to-left direction. The fabric entity replaces the credit count value of 256 (in one embodiment) with the value of its right-to-left receive buffer, 2 (in one embodiment), and forwards the frame in the left-to-right direction.

Control then continues to block 540 where end node D receives the login request and processes it by removing the credit count of 2 (in one embodiment) and programming it into the transmitter. End Node D forms the login reply frame, containing all pertinent information, including its own credit count of 8 (in one embodiment), and transmits it. Note that End Node D has received all login parameters from End Node A, except the credit count, which came from FCCE C.

Control then continues to block 550 where FCCE C receives the login reply frame and forwards it to the fabric entity. The fabric entity removes the credit count of 8 (in one embodiment) and programs it into the transmitter going in the left-to-right direction. The fabric entity replaces the credit count value of 8 (in one embodiment) with the value of its left-to-right receive buffer, 256 (in one embodiment), and forwards the frame in the right-to-left.

Control then continues to block 560 where FCCE B receives the login reply frame and forwards it to the fabric entity. The fabric entity removes the credit count of 256 (in one embodiment) and programs it into the transmitter going in the left-to-right direction. The fabric entity replaces the credit count value of 256 (in one embodiment) with the value of its left-to-right receive buffer, 2 (in one embodiment), and forwards the frame in the right-to-left direction.

Control then continues to block 570 where End Node A receives the login reply frame and forwards it to the fabric entity. The fabric entity removes the credit count of 2 (in one embodiment) and programs it into the transmitter. Note that End Node A has received all login parameters from End Node D, except the credit count, which came from FCCE B.

Control then continues to block 599 where the process completes. When this process is complete, both end nodes have been involved in a compliant Fibre Channel login sequence with each other, exchanging all required parameters, the only exception being credit counts. This process is therefore transparent to the end nodes.

This device can be implemented in either off-the-shelf devices such as FC Endecs and FPGAs in one embodiment, or as an ASIC specific to this function in another embodiment. In still another embodiment, the device can be implemented using a processor-based system where the processor reads and executes instructions contained in memory. The instructions defining the functions of this embodiment can be delivered to the FCCE via a variety of signal-bearing media, which include, but are not limited to:

(1) information permanently stored on non-writeable storage media (e.g., read-only memory devices within a computer such as CD-ROM disks) readable by an unillustrated CD-ROM drive;

(2) alterable information stored on writeable storage media (e.g., floppy disks within a diskette drive, a tape within a tape drive, or disks within a hard-disk drive); or (3) information conveyed by a communications media, such as through a computer or telephone network including wireless communications.

Such signal-bearing media, when carrying computer-readable instructions that direct the functions of the present invention, represent embodiments of the present invention.

Figure 6:
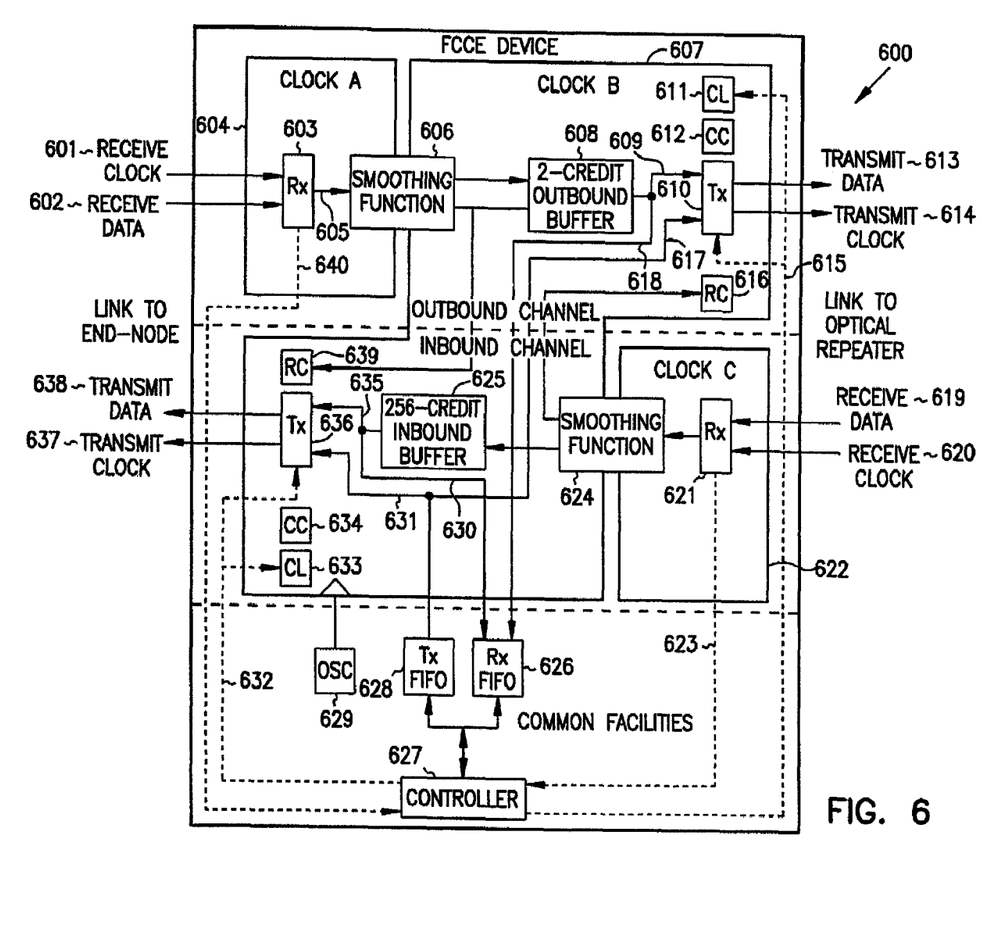
FIG. 6 depicts a block diagram of an example FCCE device, according to an embodiment of the invention.

FIG. 6 depicts an example FCCE device, according to an embodiment. The FCCE device interfaces to the end node on the left side, to the long distance link on the right side, and has three main functional areas.

The Outbound Channel, sourcing data to the long-distance link.

The Inbound Channel, sinking data from the long-distance link.

The Common Facilities, which control the entire device.

The Outbound Channel

The Outbound Channel forwards end-node transmitted data to the optical repeater. The Outbound Channel exists primarily to provide a means to implement buffer-to-buffer flow control and as a means to intercept and manipulate credit fields in Login frames. The number of credits shown is very low because it is assumed that the distance between the FCCE and the end node is very short.

Receive Clock 601 and Receive Data 602 represent a parallel link interface, where the FCCE is either connected to an external serializer/deserializer, or directly connected to the end node in a typical glueless interconnect. The Receive Clock 601 becomes the logic clock for all logic in Clock A (604).

The Receiver (Rx) function 603 processes incoming link data, providing the following functions.

- Converts 10B to 8B with error detection. If errors are detected on incoming frames, the frame EOF will be modified.
- Handles the Receiver Ready primitive signal (R_RDY) by passing it to the transmitter credit state machine Counter CC 634.
- Handles the primitive sequences of LR, LRR, NOS, and LOS as per FC rules, and supplies these as status 640 to the Controller 627.
- Performs the Sync_Acquired, Sync-Lost state machines as per FC rules, supplying them as status 640 to the Controller 627.
- Parses frames, inspecting each for type and content.
- All incoming frames are written via path 605 into the Smoothing Function 606 using Clock A 604 timing.

The Smoothing Function 606 is used to smooth the frequency difference between Clock A 604 and Clock B 607. Typically both clock domains run at the identical nominal frequency, but which can vary by ±100 ppm if in a FC environment. The Smoothing function will add FC primitives if the write side clock is slower than the read side clock, or will delete primitives if the opposite relationship is true. The FC primitives used for smoothing are IDLEs, LR, LRR, NOS or OLS, depending on current traffic. Smoothing would occur between frames but never during a frame.

Clock B 607 is the main fabric clock, clocking transmissions in both directions. Its frequency source is a local oscillator 629, which is typically a harmonic of the nominal FC link frequency being used.

The 2-Credit Outbound Buffer 608 provides the re-transmission path of frames originally transmitted by the local end node. This buffer is required because the Outbound Channel receiver is in a different credit domain than is the Outbound Channel transmitter. The number of receive credits is low because of the assumed very short link distance to the local end node. This buffer routes selected frames such as FLOGI and PLOGI via path 618 to the Rx FIFO 626 and then to the Controller 627 for processing. Rx FIFO 626 performs a transmformation from a coded to an uncoded signal. All other frames are routed via 609 to the Outbound Transmitter 610.

The Outbound Transmitter 610 has the following functions.

- Selects the data to be transmitted next, which could be:
  - IDLEs, if nothing else is to be transmitted, or
  - R_RDYs, if R_RDY Counter (RC) (616) commands, or
  - Link frames, if they exist in the Outbound buffer 608, or
  - Controller frames, if they exist in the Tx FIFO 628.
- Keeps track of the number of R_RDYs to be transmitted via RC 616. RC 616 is an up/down counter, which increments by one each time the Inbound Buffer 625 is emptied of a frame, and decrements each time an R_RDY is transmitted. When RC is non-zero, it commands the transmitter to source R_RDYs.
- Keeps track of credit consumed via Credit Counter (CC) 612. CC 612 is an up/down counter that increments every time a frame is transmitted, and decrements every time an R_RDY is received on the Inbound Channel.
- When RC value=LC value, all available credit has been consumed, and transmission of frames must cease until additional R_RDYs are received.
- Keeps track of max remote credit via Credit Limit (CL) register 611. CL 611 is a register that holds the maximum credit at the remote end of the link, which is compared against CC 612 to determine if credit exists for transmission. CL is written by Controller 627, which writes the appropriate credit limit as gleaned from a PLOGI or FLOGI frame.
- Converts internal 8B codes to link 10B codes.
- Formats data to the external parallel interface.

The parallel interface to Transmit Data 613 and Transmit Clock 614 typically feed the serializer side of a serializer/deserializer, which in turn feeds the outbound optical repeater.

Inbound Channel

The Inbound Channel forwards optical repeater received data to the end node. The Inbound Channel exists primarily to provide the high receive buffer credit count to attain the maximum link bandwidth, but also to provide the means to implement buffer-to-buffer flow control and as a means to intercept and manipulate credit fields in Login frames.

The Inbound Channel is identical to the outbound channel in all respects, except that the Inbound Buffer 625 holds a very large number of credits, to a maximum of 256, which is used to gain fill bandwidth on the long link. This is the feature that FCCE uses to increase long link bandwidth.

Inbound Channel find numbers 619-624, and 630-639 are identical in function to Outbound Channel find numbers 601-607, 609-618 and 640.

Common Facilities

Controller 627 is a state machine that controls the action of this device, and may be implemented entirely in hardware, or it may be an embedded or non-embedded micro-controller or microprocessor executing software. Its primary functions are:

- Initialize the device on powerup.
- Initialize the links, both inbound and outbound.
- Reads login frames out of Rx FIFO 626.
- Distribute the credit counts in the original frames, and insert new credit counts before retransmitting the frames.
- Writes login frames into Tx FIFO 628.
- Handle link exceptions.

The Rx FIFO 626 is a frame buffer that holds frames (typically PLOGI and FLOGI) that the Inbound Buffer 625 and Outbound Buffer 608 choose to re-vector to Controller 627, which reads the frames as they appear in Rx FIFO. Rx FIFO 626 performs a transformation from a coded to an uncoded signal.

The Tx FIFO 628 is a frame buffer that holds frames (typically PLOGI and FLOGI) that are destined to be transmitted on the Outbound Tx 610 or the Inbound Tx 636. The Controller 627 writes the frames to Tx FIFO, and a transmitter reads the frame when ready. TX FIFO 628 performs a transformation from an uncoded to a coded signal.

Buffer-To-Buffer Credit Manipulation

Figure 7:
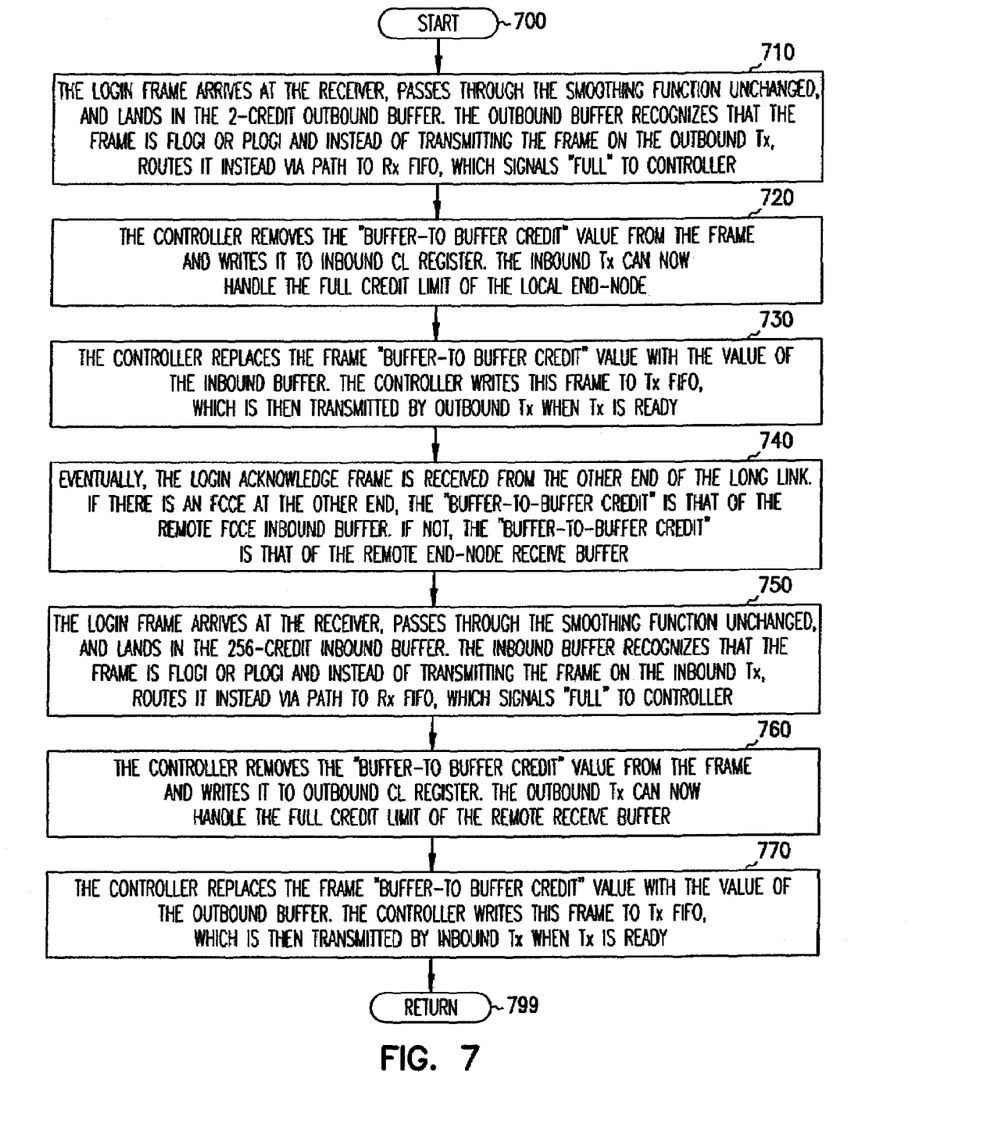
FIG. 7 depicts an example flowchart for setting up credit for a single FCCE where the original login request frame was sourced at the left end node, according to an embodiment of the invention.

FIG. 7 depicts a example flowchart for setting up credit for a single FCCE where the original login request frame was sourced at the left end node, according to an embodiment of the invention. FIG. 7 depicts a method that is a subset of the prior description of setting up credit across the entire link consisting of two end nodes and two FCCEs. The processing depicted in FIG. 7 covers only a single FCCE where the original login request frame was sourced at the left end node.

Control begins at block 700. Control then continues to block 710 where the login frame arrives at the receiver 603, passes through the Smoothing Function 606 unchanged, and lands in the 2-Credit Outbound Buffer 608. The Outbound Buffer recognizes that the frame is FLOGI or PLOGI and instead of transmitting the frame on the outbound Tx 610, routes it instead via path 618 to Rx FIFO 626, which signals "full" to Controller 627.

Control then continues to block 720 where controller 627 removes the "Buffer-To-Buffer Credit" value from the frame and writes it to Inbound CL register 633. The Inbound Tx 636 can now handle the full credit limit of the local end node.

Control then continues to block 730 where controller 627 replaces the frame "Buffer-To-Buffer Credit" value with the value of the Inbound Buffer 625, which is 256. Controller 627 writes this frame to Tx FIFO 628, which is then transmitted by Outbound Tx 610 when Tx is ready.

Control then continues to block 740 where eventually, the login acknowledge frame is received from the other end of the long link. If there is an FCCE at the other end, the "Buffer-To-Buffer Credit" is that of the remote FCCE Inbound Buffer. If not, the "Buffer-To-Buffer Credit" is that of the remote end-node receive buffer.

Control then continues to block 750 where the login frame arrives at the receiver 621, passes through the Smoothing Function 624) unchanged, and lands in the 256-Credit Inbound Buffer 625. The Inbound Buffer recognizes that the frame is FLOGI or PLOGI and instead of transmitting the frame on the Inbound Tx 636, routes it instead via path 630) to Rx FIFO 626, which signals "full" to controller 627.

Control then continues to block 760 where controller 627 removes the "Buffer-To-Buffer Credit" value from the frame and writes it to Outbound CL register 611. The Outbound Tx 610 can now handle the full credit limit of the remote receive buffer.

Control then continues to block 770 where controller 627 replaces the frame "Buffer-To-Buffer Credit" value with the value of the Outbound Buffer 628, which is 2. Controller 627 writes this frame to Tx FIFO 628, which is then transmitted by Inbound Tx 636 when Tx is ready. Control then continues to block 799 where the function ends. The FCCE has now initialized credit and normal frame traffic can start.

FCCE Controller

The following are some of the Fibre Channel functions that controller 627 is involved in.

ELS Frame Processing

Some Extended Link Service (ELS) frames need to be modified. These are frames where buffer-to-buffer flow control data has to be manipulated.

FLOGI (Fabric Login)
The FCCE starts out with Fabric mode off. If an FLOGI frame is received, the Fabric mode flag is turned on and the "Buffer-To-Buffer Credit" field in the FLOGI frame is changed to manipulated as described earlier. The OX_ID is remembered so that the ACC reply can be identified.

PLOGI (N-Port Login)
If the FCCE is not in Fabric mode, the "Buffer-To-Buffer Credit" field in the PLOGI is manipulated as described earlier. The OX_is remembered so that the ACC can be identified.

FDISC
If the FCCE is in Fabric mode, the "Buffer-To-Buffer Credit" field in the FDISC frame is manipulated as described earlier. The OX_ID is remembered so that the ACC can be identified.

PDISC
If the FCCE is not in Fabric mode, the "Buffer-To-Buffer Credit" field in the PDISC frame is manipulated as described earlier. The OX_ID is remembered so that the ACC can be identified.

ACC (ELS Accept)
If the ACC OX_ID matches a remembered ELS OX_ID and the frame is at least the minimum length for a login ACC (116 bytes), the frame is assumed to be a reply to a login frame. The "Buffer-To-Buffer Credit" field is manipulated as described earlier. The remembered OX_ID is cleared.

SW ILS Frame Processing

These frames are used to configure Fabrics created by linking multiple switches together.

ELP Exchange Link Parameters)
The "Buffer-To-Buffer Credit" field in the ELP is manipulated as described earlier. The OX_ID is remembered so that the SW_can be identified. If ELP frames have been received in both directions, the FCCE goes into Fabric mode.

SW_ACC (Switch Services Accept)
If the SW_ACC OX_ID matches a remembered ELP OX_ID, and the frame is the minimum length for an ELP SW_ACC, the frame is assumed to be a reply to the ELP. The "Buffer-To-Buffer Credit" field is manipulated as described earlier. The remembered OX_is cleared. The FCCE goes into Fabric mode.

Primitive Processing

The FCCE will generally pass received primitives on to the other end, or discard them (AL primitives).

NOS, OLS, LR LRR Primitives
If one of these primitives is received, the FCCE may send or discard frames in the buffers for the channel. No R_RDYs are sent for frames that are transmitted out the other side while a primitive is being received. Once all received frames are gone, the currently received primitive is sent to the channel transmitter. Flow control is reset by clearing the CC counter for the channel receiving the primitive and the RC counter of the other channel.

AL Primitives
All Arbitrated Loop primitives (LIP, ARB, etc.) are discarded and replaced with the Idle ordered set.

Loss of Sync
If sync is lost for R_T_TOV (100 milliseconds), all frames in the channel buffer are discarded. The channel transmitter transmits a 10 bit code of all 0, which should cause loss of sync at the other end of the link.

II. Fibre Channel Credit Based Repeater Embodiment

In the fibre channel credit based repeater embodiment, a FCBR (Fibre Channel Credit Based Repeater) can either be transparent to the end nodes, or non-transparent.

For a transparent application, the end node fabric management facilities are not aware of the FCBR presence, and do not contain FCBR-specific functions used for FCBR management. FCBR initialization, error handling and assignment of "BB_Credit" are FCBR functions.

For a non-transparent application, the end node fabric management facilities are aware of the FCBR presence, and contain FCBR-specific function used for FCBR management. FCBR initialization, error handling and assignment of "BB_" are end-node functions.

Figure 8:
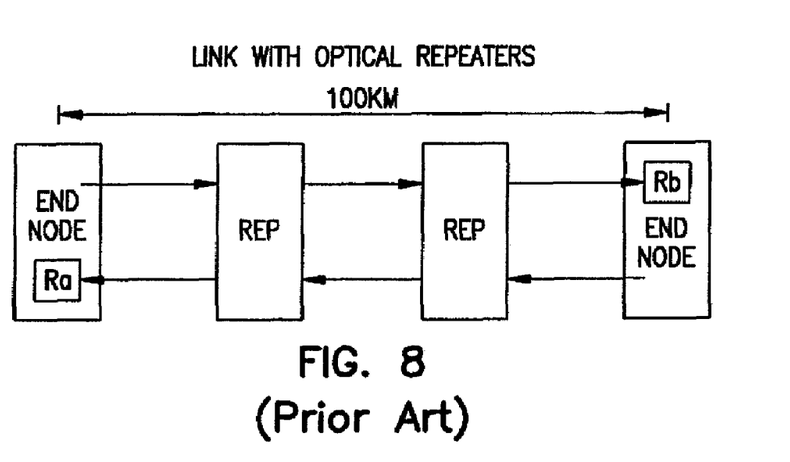
FIG. 8 depicts a block diagram of an example of a prior art fibre channel link with optical repeaters.

FIG. 8 depicts a block diagram of a prior art example of a fibre channel link with optical repeaters, which shows a 100 KM link utilizing only optical repeaters (Rep), and showing the receive buffers (Rb) whose credit counts determine the max link bandwidths.

When the End Node receive buffers Ra and Rb contain typical credit counts of 8-32, the optical repeaters give the 100 KM distance required, but the maximum bandwidth on either link will be 12% (at 8 credits) to 50% (at 32 credits) of the theoretical maximum for 100 MB/s at 1G. The FCBR solves this problem.

The Transparent FCBR

The Fibre Channel Credit Based Repeater (FCBR) is a device that is connected between an end node and an optical repeater, that contains as many buffer credits as necessary, to solve the bandwidth problem. In a situation where maximum bandwidth is required in both directions of a link, it essentially breaks a single logical link into three physically separated "linklets." The short-distance linklets (typically within the same room) attain maximum bandwidth by use of the existing buffer credits of the end nodes. The long-distance linklet (typically dark fiber up to 100 KM) attains maximum bandwidth by use of very high receive buffer credits in the FCBRs.

Figure 9:
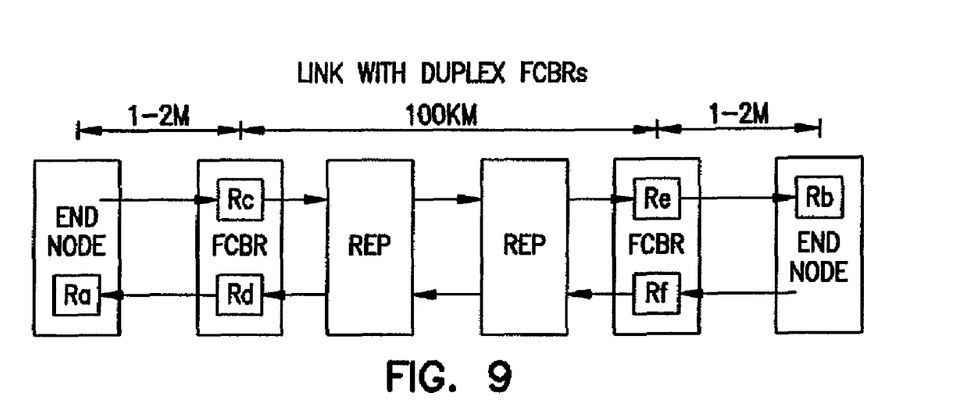
FIG. 9 depicts a block diagram of a 100 KM link with the inline FCBRs (Fibre Channel Credit Based Repeaters), coupled with optical repeaters, according to an embodiment of the invention.

FIG. 9 depicts a block diagram of a 100 KM link with the inline FCBRs, coupled with optical repeaters, according to an embodiment of the invention.

Buffers Re and Rd are at the end of the long links, and contain enough credits (approximately 60 credits for 100 KM at 1 Gb in one embodiment) to insure maximum bandwidth on the link. Buffers Rc and Rf are very small (approximately 2 credits for a connection within the same room, in one embodiment) and exist purely to maintain the linklet credit management. In this way, only those links that need maximum bandwidth over distances not covered by end-node credit counts, need be attached to an FCBR. The FCBR shown contains the high credit count receive buffers to gain bandwidth on the link. All other ports of a switch can have smaller and cheaper receive buffers.

Figure 10:
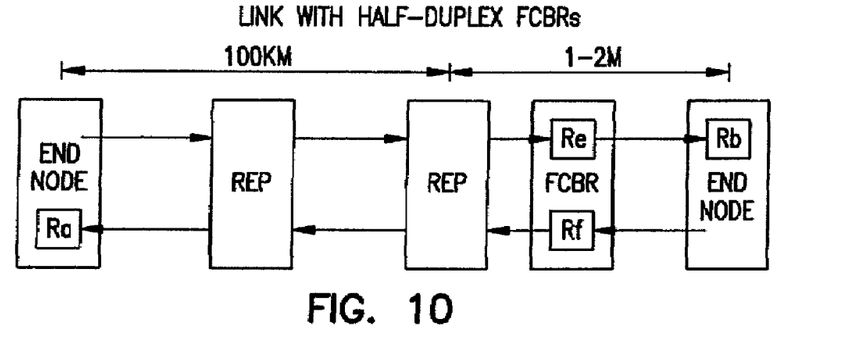
FIG. 10 depicts a block diagram of a link with half-duplex FCBRs where the left-to-right direction has the maximum bandwidth, according to an embodiment of the invention.

As a cost savings, if the maximum bandwidth requirement is in one direction only, the FCBR can be installed on only one end, the end that is receiving the high bandwidth. In FIG. 10, the left-to-right direction has the maximum bandwidth. The same diagram also applies when duplex full bandwidth is required, where Ra has sufficient credits, and Rb does not.

Figure 11:
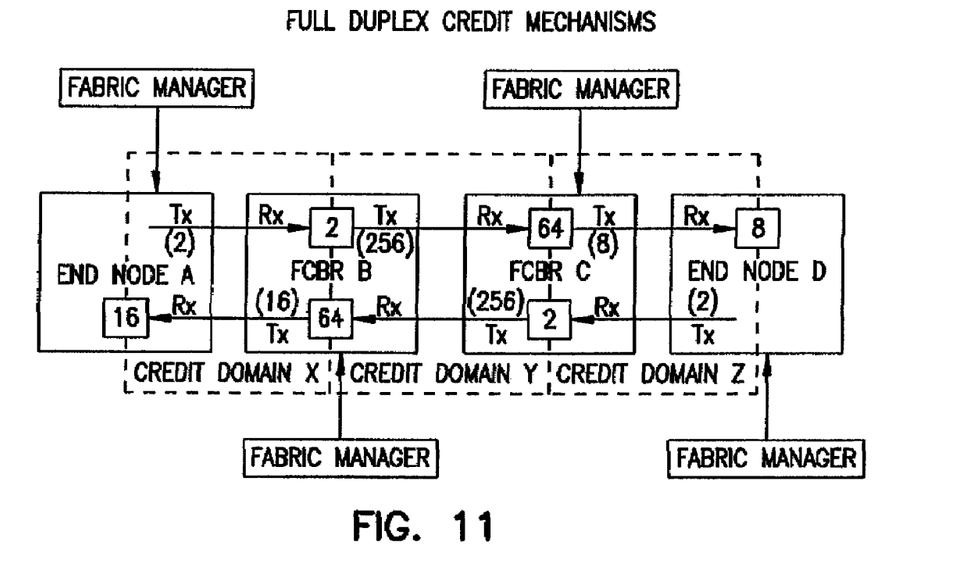
FIG. 11 depicts a block diagram of the duplex link that is simplified showing only the credit mechanisms, which are what determines bandwidth on the link, according to an embodiment of the invention.

FIG. 11 depicts a block diagram of the duplex link that is simplified showing only the credit mechanisms, which are what determines bandwidth on the link, where all receive buffers are shown with some suggested FCBR receive buffer credit values high enough to solve typical bandwidth problems.

The end nodes show typical credit counts of 8 and 16. The FCBR has ideal credit counts for 100 Km at 1G, where 2 credits are sufficient for the linklet length of 1-2 meters between the end node and the FCBR, and 64 credits between the FCBRs on either end of the long linklet.

Each linklet is a separate credit domain, and each follows Fibre Channel rules for R_RDY flow control within the domain. Shown in parenthesis are the remote credit counts that each transmitter must deal with for the transparent FCBR concept to work. There must be a method where these credits are properly distributed prior to full bandwidth use of the link. These credits can be gained by intercepting the login request and response frames in the FCBRs for the purpose of manipulating the credit counts. Prior to BB_Credit disbursement by this method, all devices, including the end nodes and the FCBRs follow the Fibre Channel practice of assuming one credit receive buffers until a larger credit count is specified.

The processing for all login frames that are intercepted by the FCBR and delivered to the FCBR "fabric" is the same as that described above with reference to FIG. 5, except that the value of the right-to-left receive buffer in blocks 520 and 550 is 64 and the credit count in blocks 530 and 560 is 64. When this processing is complete, both end nodes have been involved in a compliant Fibre Channel login sequence with each other, exchanging all required parameters, the only exception being credit counts. This process is therefore transparent to the end nodes.

Transparent FCBR Hardware

The FCBR hardware can be the same as that previously described above with reference to FIG. 6.

Transparent FCBR Credit Manipulation

The buffer-to-buffer credit manipulation can be the same as that previously described above with reference to FIG. 7, except that in block 750 the credit inbound buffer has 64 credits instead of 256.

Primitive Processing

The primitive processing is the same as that previously described above with respect to the fibre channel credit extender embodiment, except for NOS, OLS, LR, and LRR primitives:

NOS, OLS, LR, LRR Primitives

If one of these primitives is received, the FCBR may send or discard frames in the buffers for the channel. No R_RDYs are sent for frames that are transmitted out the other side while a primitive is being received. Once all received frames are gone, the currently received primitive is sent to the channel transmitter. Flow control is reset by clearing the CC counter for the channel receiving the primitive and the RC counter of the other channel.

The Non-Transparent FCBR Embodiment

This embodiment is much simpler than the Transparent FCBR embodiment, because in the non-transparent FCBR embodiment, the FCBR is in the realm of the end-node fabric manager facility, which controls FCBR initialization and distribution of BB_Credit Since there is no need for the FCBR to sink and source frames, these buffers and the outbound link buffer are not needed.

Figure 12:
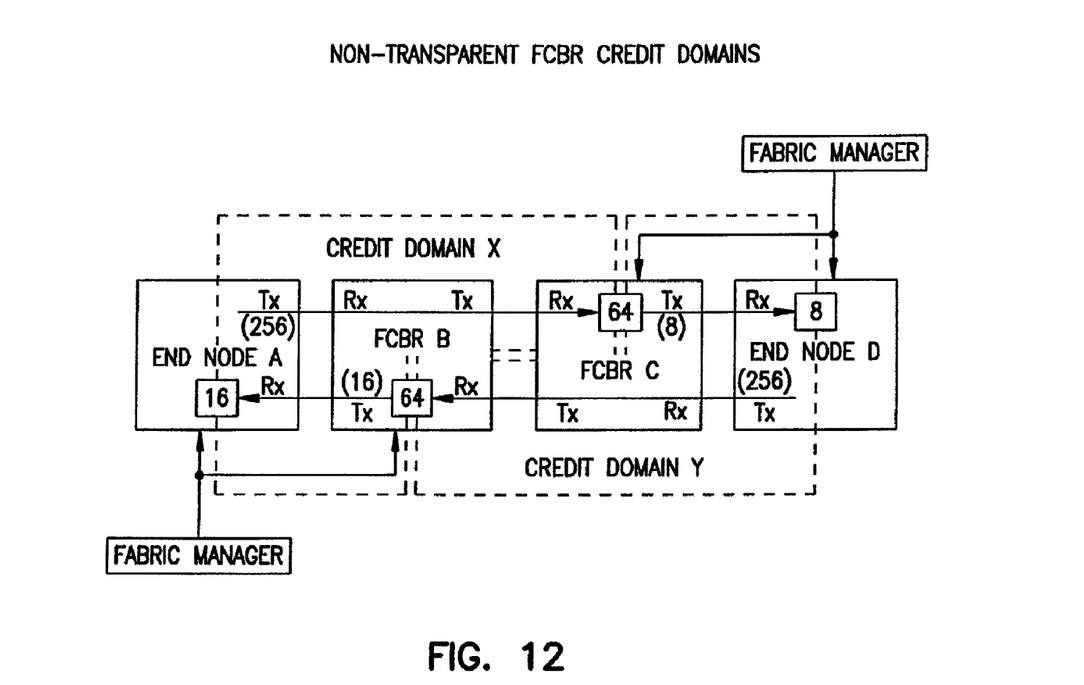
FIG. 12 depicts a block diagram that illustrates example non-transparent FCBR credit domains, according to an embodiment of the invention.

FIG. 12 is a block diagram that depicts the non-transparent FCBR credit domains. Three differences relative to the transparent model are shown.

The credit domains are reduced from 3 to 2.

The FCBR fabric management is controlled by the end-node fabric managers.

The long link advertised credit is the sum of the end-node credits and the FCBR credits.

When End Node A receive buffer is emptied of a frame, the resulting R_RDY is transmitted to FCBR B transmit state machine, and to End Node D transmit state machine, bypassing the FCBR C buffer. Similarly, when End Node B receive buffer is emptied of a frame, the resulting R_RDY is transmitted to FCBR A transmit state machine, and to End Node A transmit state machine, bypassing the FCBR B buffer.

FLOGI frames are not intercepted by the FCBRs, but are passed unchanged to the end-node fabric managers, which program the correct BB_Credit values in both the end-node and the attached FCBR transmit state machines.

In the right-to-left path, the advertised credit available to the right end node is 64+16=80. If the FCBR B receive buffer physically contains room for exactly 64 credits and no more, then the advertised credit is 64+16−1=79. Holding back a single credit is required to prevent overflow at FCBR B when End Node D, for example, transmits a frame in response to an R_RDY from End Node A, but the frame hole has not migrated to FCBR B before End Node D transmits the frame. Similarly, in the left-to-right path, the advertised credit can be 64+8−1=71.

Figure 13:
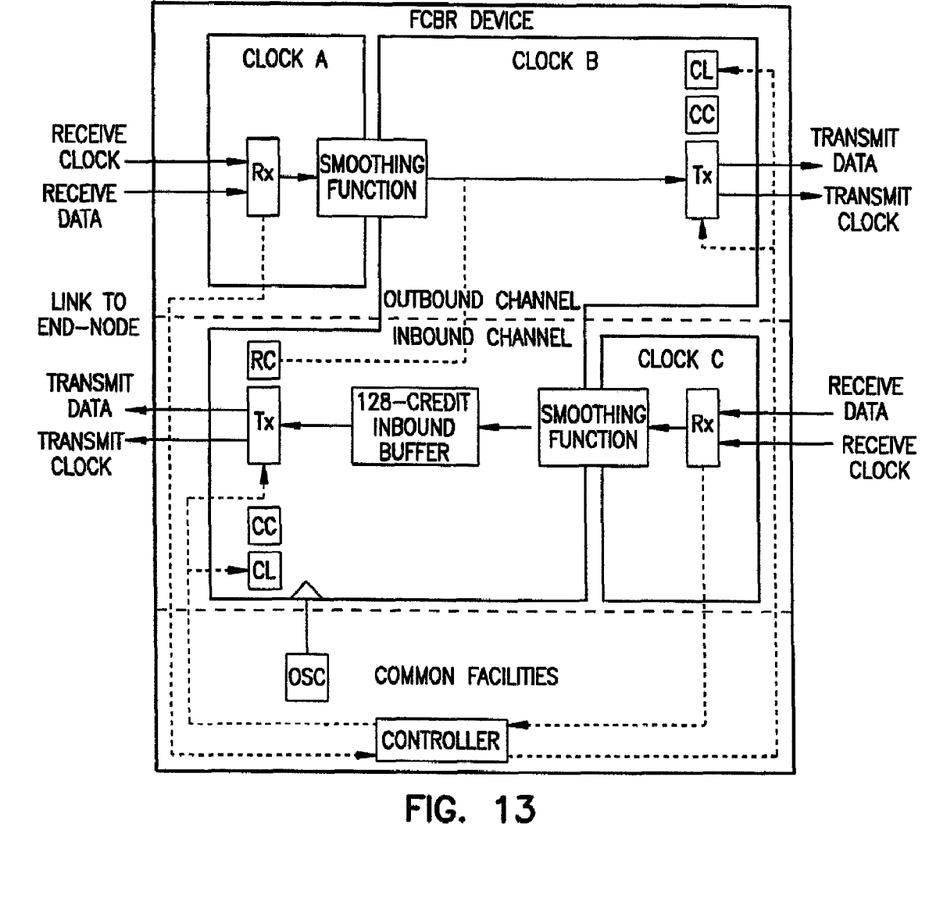
FIG. 13 depicts a block diagram that illustrates an example FCBR device suitable for use in the non-transparent environment, according to an embodiment of the invention.

FIG. 13 is a block diagram that illustrates example FCBR device suitable for use in the non-transparent environment. Note the following differences from the transparent environment:

- There is no frame buffer to the long link, nor fabric manager frame sink and source facilities.
- All transmissions from the End Node are repeated onto the long link, including R_RDYs.
- R_RDYs from the local End Node are fed both to the long link and to the transmit state machine feeding the local End Node.
- R_RDYs from the remote end node are neither sunk nor used in the FCBR, but are passed onto the local End Node.
- All local end Node transmissions are repeated onto the long link, subject to smoothing. Note that if the local end node device and the FCBR device derive clocks from the same oscillator, then the smoothing function can be deleted.

What is claimed is:

1. A system, comprising:
    a fibre channel switch with a plurality of fabric ports;
    a repeater connected to a selected one of the plurality of fabric ports through a fibre channel linklet, wherein the selected one of the plurality of fabric ports includes a number of credits; and
    an inline link device connected in the fibre channel linklet between the repeater and the fibre channel switch, the inline link device including an outbound receiver associated with a first number of credits to receive data packets from the fibre channel switch, and an inbound receiver associated with a second number of credits, the second number of credits associated with the inbound receiver being larger than the first number of credits associated with the outbound receiver,
    wherein the inline link device includes:
    an outbound channel adapted to source data, including the outbound receiver, an outbound transmitter, and an outbound channel buffer connected between the outbound receiver and the outbound transmitter, the outbound channel buffer having the first number of credits;
    an inbound channel adapted to sink data, including the inbound receiver, an inbound transmitter, and an inbound channel buffer connected between the inbound receiver and the inbound transmitter, the inbound channel buffer having the second number of credits;
    each of the inbound and outbound channels of the inline link device including:
        a Credit Counter (CC) to track credit consumed for the respective channel by comparing frames transmitted in the channel against Receiver Ready signals (R_RDYs) received on the other channel; and
        a Credit Limit (CL) register to hold a maximum credit for the respective channel for use in comparing to the credit counter (CC) to determine if credit exists for transmission; and
    a controller connected to the outbound and inbound channels, the controller being adapted to:
        read a credit value from a login frame in a first one of the inbound and outbound channels and write the credit value to the credit limit (CL) register in the other one of the inbound and outbound channels;
        replace the credit value in the login frame with a credit value of the channel buffer for the other one of the inbound and outbound channels; and
        write the login frame to a frame buffer for transmission by the transmitter in the first one of the inbound and outbound channels.

2. The system of claim 1, wherein the second number of credits for the inbound channel buffer is selected to account for a predetermined transmission speed and a predetermined length of a link from which data is sinked.

3. An inline link device adapted to be connected between a local fibre channel node over a short-distance link, and to be connected to an optical repeater where the optical repeater is used to communicate to another node over a long distance link in comparison to the short-distance link, the inline link device comprising:
    an outbound channel adapted to source data to the long-distance link, including an outbound channel receiver, an outbound channel transmitter, and an outbound channel buffer connected between the outbound channel receiver and the outbound channel transmitter, the outbound channel buffer having a predetermined number of credits;
    an inbound channel adapted to sink data from the long distance channel, including an inbound channel receiver, an inbound channel transmitter, and an inbound channel buffer connected between the inbound channel receiver and the inbound channel transmitter, the inbound channel buffer having a predetermined number of credits, wherein the predetermined number of credits for the inbound channel buffer is greater than the predetermined number of credits for the outbound channel buffer;
    each of the inbound and outbound channels of the inline link device including:
        a Credit Counter (CC) to track credit consumed for the respective channel by comparing frames transmitted in the channel against Receiver Ready signals (R_RDYs) received on the other channel; and
        a Credit Limit (CL) register to hold a maximum credit for the respective channel for use in comparing to the credit counter (CC) to determine if credit exists for transmission;
    a controller connected to the first and second transmitters and the first and second receivers, the controller being adapted to:
        read a credit value from a login frame in a first one of the inbound and outbound channels and write the credit value to the credit limit (CL) register in the other one of the inbound and outbound channels;
        replace the credit value in the login frame with a credit value of the channel buffer for the other one of the inbound and outbound channels; and
        write the login frame to a frame buffer for transmission by the transmitter in the first one of the inbound and outbound channels.

4. The device of claim 3, wherein the predetermined number of credits for the inbound channel buffer is selected to account for a predetermined transmission speed over the long distance link and a predetermined length of the long distance link.

5. The device of claim 3, wherein each of the inbound and outbound channels further includes a R_RDY Counter (RC) to track the number of R_RDYs transmitted in the first one of the inbound and outbound channels against a number of frames removed from the buffer in the other one of the inbound and outbound channels, and to command the transmitter to source R_RDYs through the first one of the inbound and outbound channels when the buffer in the other channel has memory to receive further frames.

6. The device of claim 3, further comprising an outbound buffer that recognizes that the login frame is a fabric login (FLOGI) or a processor login (PLOGI) and routes the login frame to a frame buffer that performs a transformation from a coded to an uncoded signal and sends a full signal to the controller.

* * * * *

UNITED STATES PATENT AND TRADEMARK OFFICE
CERTIFICATE OF CORRECTION

PATENT NO.        : 7,443,794 B2
APPLICATION NO. : 10/166570
DATED             : October 28, 2008
INVENTOR(S)      : George et al.

It is certified that error appears in the above-identified patent and that said Letters Patent is hereby corrected as shown below:

In column 7, lines 48-49, delete "transmformation" and insert -- transformation --, therefor.

In column 8, line 27, delete "fill" and insert -- full --, therefor.

In column 8, line 41, delete "retransmitting" and insert -- re-transmitting --, therefor.

In column 9, line 61, after "OX_" insert -- ID --.

In column 10, line 16, before "exchange" insert -- ( --.

In column 10, line 19, after "SW_" insert -- ACC --.

In column 10, line 28, after "OX_" insert -- ID --.

In column 10, line 33, after "OLS, LR" insert -- , --.

In column 10, line 66, after ""BB_"" insert -- Credit --.

In column 12, line 37, after "BB_Credit" insert -- . --.

In column 13, line 52, in Claim 1, delete "credit counter" and insert -- Credit Counter --, therefor.

In column 13, line 57, in Claim 1, delete "credit limit" and insert -- Credit Limit --, therefor.

In column 14, line 33, in Claim 3, delete "credit counter" and insert -- Credit Counter --, therefor.

UNITED STATES PATENT AND TRADEMARK OFFICE
CERTIFICATE OF CORRECTION

PATENT NO. : 7,443,794 B2
APPLICATION NO. : 10/166570
DATED : October 28, 2008
INVENTOR(S) : George et al.

It is certified that error appears in the above-identified patent and that said Letters Patent is hereby corrected as shown below:

In column 14, line 39, in Claim 3, delete "credit limit" and insert -- Credit Limit --, therefor.

Signed and Sealed this

Tenth Day of February, 2009

JOHN DOLL
*Acting Director of the United States Patent and Trademark Office*